United States Patent [19]

Fox et al.

[11] Patent Number: 5,447,986
[45] Date of Patent: Sep. 5, 1995

[54] ACCELERATION OF GELATION OF WATER SOLUBLE POLYMERS

[75] Inventors: Kelly B. Fox; Alvin Evans, Jr., both of Bartlesville, Okla.

[73] Assignee: Phillips Petroleum Company, Bartlesville, Okla.

[21] Appl. No.: 908,673

[22] Filed: Jun. 29, 1992

[51] Int. Cl.⁶ ............................................. C08K 3/28
[52] U.S. Cl. ..................... 524/555; 523/130; 524/593; 524/596
[58] Field of Search ............... 524/555, 593, 596; 523/130

[56] References Cited

U.S. PATENT DOCUMENTS

| | | | |
|---|---|---|---|
| 4,440,228 | 4/1984 | Swanson | 166/274 |
| 4,632,185 | 12/1986 | Moradi-Araghi et al. | 166/273 |
| 4,785,028 | 11/1988 | Hoskin et al. | 523/130 |
| 5,003,006 | 3/1991 | Chu et al. | 525/92 |
| 5,071,890 | 12/1991 | Shu et al. | 523/130 |

OTHER PUBLICATIONS

The Chemistry of Phenolic Resins (R. W. Martin, 1955), pp. 260–262.
Sandler and Karo, Polymer Syntheses, vol. II, p. 9, 1977.

*Primary Examiner*—Paul R. Michl
*Assistant Examiner*—John J. Guarriello
*Attorney, Agent, or Firm*—Lucas K. Shay

[57] ABSTRACT

A gellable composition for oil field operations and a process for accelerating the gelation of the gellable composition for shut-in well are disclosed. The composition comprises: (1) an ammonium ion donor; (2) a water soluble acrylamide-containing polymer; (3) a first crosslinking component selected from the group consisting of aldehydes and aldehyde-generating compounds; (4) a second crosslinking component selected from the group consisting of an aromatic compound and an alcohol where the aromatic compound is selected from the group consisting of phenols and acids; and (4) water.

25 Claims, No Drawings

ACCELERATION OF GELATION OF WATER SOLUBLE POLYMERS

FIELD OF THE INVENTION

The present invention relates to the gelation of water soluble polymers by organic crosslinking agents.

BACKGROUND OF THE INVENTION

It is well known to those skilled in the art that gelled water soluble polymers are useful in enhanced oil recovery operations. A gellable composition comprising a polymer solution is often injected into reservoir rocks and subsequently crosslinked in order to block pore spaces, fractures and other void spaces for the purpose of altering fluid flow to or from the wellbore. Injection of a crosslinked polymer mass into the reservoir subjects the gel structure to mechanical forces that can result in complete degradation of the gel. In order to protect the integrity and quality of the gel, crosslinking of the polymer is normally delayed so that the gel structure is formed in-situ, under low shear or static conditions. At temperatures above 80° C., obtaining a delay in the gellation normally requires the use of organic crosslinkers (e.g. phenol-formaldehyde, furfuryl alcohol-formaldehyde, etc.). Unfortunately, these delays are often too long, and result in extended shut-in periods for the well. The shut-in period results in a loss in production and revenue. In order to minimize the required shut-in times, it is necessary to reduce gel times to just a few hours or days.

SUMMARY OF THE INVENTION

It is, therefore, an object of the present invention to provide a gellable composition. Another object of the present invention is to provide a process for accelerating the gellation of the gellable composition. Other objects, advantages, features and aspects of the present invention will become more apparent as the invention is more fully described in the following disclosure.

According to one embodiment of the present invention, a composition for oil field operations is provided which comprises (1) an ammonium ion donor; (2) a water soluble acrylamide-containing polymer; (3) a first crosslinking component selected from the group consisting of aldehydes and aldehyde-generating compounds; (4) a second crosslinking component selected from the group consisting of an aromatic compound and an alcohol where the aromatic compound is selected from the group consisting of phenols and acids; and (4) water.

According to another embodiment of the present invention, a process for accelerating the gelation of a gellable composition for a shut-in well is provided which comprises injecting the gellable composition through the well where it forms a gel, the gellable composition comprising: (1) an ammonium ion donor; (2) a water soluble acrylamide-containing polymer; (3) a first crosslinking component selected from the group consisting of aldehydes and aldehyde-generating compounds; (4) a second crosslinking component selected from the group consisting of an aromatic compound and an alcohol where the aromatic compound is selected from the group consisting of phenols and acids; and (4) water.

DETAILED DESCRIPTION OF THE INVENTION

The ammonium ion donor of the gellable composition that accelerates gelation can be an inorganic or organic compound and is generally water dispersible. The term "water dispersible" used herein is to describe a component of the gellable composition that is truly water soluble or forms a stable suspension with water. Suitable ammonium ion donors include, but are not limited to ammonia, ammonium hydroxide, ammonium chloride, ammonium iodide, ammonium bromide, ammonium carbonate, ammonium nitrate, ammonium sulfate, ammonium phosphate, ammonium molybdate, ammonium acetate, ammonium formate, ammonium citrate, ammonium oxalate, hexamethylenetetramine, ammonium ethylenediaminetetraacetic acid, and mixtures thereof. The presently preferred ammonium ion donors are ammonium chloride and ammonium hydroxide.

As used in this application, the term "water soluble acrylamide-containing polymer" refers to those polymers which are homopolymers, copolymers, terpolymers, or tetrapolymers, and are truly water soluble or those which are dispersible in water or other aqueous medium to form a colloidal suspension which can be pumped into a formation and gelled therein.

The water soluble acrylamide-containing polymers which are suitable for use in the present invention include those which contain from 5 to 100 mole percent of at least one monomer of the formula:

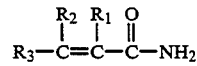

wherein $R_1$, $R_2$, and $R_3$ are selected from the group consisting of hydrogen or alkyl groups containing from 1 to 3 carbon atoms, of which acrylamide and methacrylamide are the preferred examples; and from 0 to 95 mole percent of at least one monomer selected from the group consisting of: (a) those monomers represented by the formula:

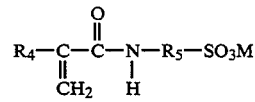

wherein $R_4$ is selected from the group consisting of hydrogen or alkyl radicals containing from 1 to 6 carbon atoms, $R_5$ is selected from the group consisting of alkylene radicals containing from 1 to 6 carbon atoms or an arylene radical containing from 6 to 10 carbon atoms, and M is selected from the groups consisting of hydrogen, ammonium, potassium, or sodium, of which 2-acrylamido-2-methylpropane sulfonic acid or sodium 2-acrylamide-2-methylpropane sulfonate are the preferred examples; or (b) monomers represented by the formula:

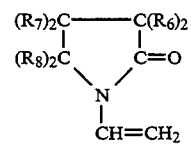

where $R_6$, $R_7$ and $R_8$ are independently selected from the group consisting of hydrogen or alkyl groups containing from 1 to 2 carbon atoms of which N-vinyl-2-pyrrolidone is the preferred example; or (c) at least one monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, N,N-dimethylacrylamide, sodium vinylbenzylsulfonate, potassium vinylbenzylsulfonate, vinylacetate, acrylonitrile, methacrylonitrile, vinyl alkyl ether, vinyl chloride, maleic anhydride, vinyl substituted cationic quaternary ammonium compounds, (acryloyloxyethyl)diethylmethylammonium methyl sulfate; or (d) mixtures thereof.

The polymerization of any of the above described monomers and their resulting polymers are well known to those skilled in the art. There are numerous references which disclose methods of polymerizing these monomers. For example, See U.S. Pat. No. 4,244,826.

The manner in which these monomers are polymerized into water soluble acrylamide-containing polymers or the resulting polymer is not critical to the practice of the present invention. Polymerization can be initiated by chemicals, irradiation, or any other techniques known to those skilled in the art.

The molecular weight of the water soluble acrylamide-containing polymers utilized in the present invention is not critical. It is presently preferred, however, that the polymer have a molecular weight of at east about 100,000 and more preferably 100,000 to 20,000,000. The upper limit is not critical as long as the polymer is still water dispersible and can be pumped into the formation.

The presently preferred class of water soluble acrylamide-containing polymers are those selected from the group consisting of homopolymers of acrylamide, homopolymers of methacrylamide, copolymers of acrylamide and acrylic acid, copolymers of acrylamide and potassium acrylate, copolymers of acrylamide and sodium acrylate, copolymers of acrylamide and N,N-dimethylacrylamide, copolymers of acrylamide and methacrylamide, copolymers of acrylamide and sodium 2-acrylamido-2-methylpropane sulfonate, copolymers of acrylamide and N-vinyl-2-pyrrolidone, terpolymers of acrylamide, N,N-dimethylacrylamide and 2-acrylamido-2-methylpropane sulfonate, and terpolymers of acrylamide, N-vinyl-2-pyrrolidone, and sodium 2-acrylamido-2-methylpropane sulfonate. The ratio of the monomers in the above-described polymers is not critical; provided however, that at least 5 mole % of acrylamide or methacrylamide is present in the above-described polymers.

Particularly preferred are homopolymers of acrylamide, copolymers of acrylamide and sodium acrylate, copolymers of acrylamide and sodium 2-acrylamido-2-methylpropane sulfonate, copolymers of acrylamide and N-vinyl-2-pyrrolidone, and a terpolymers of N-vinyl-2-pyrrolidone, acrylamide and sodium 2-acrylamido-2-methylpropane sulfonate. However, other polymers with more subunits may also be utilized in the practice of this invention. Additionally, within the scope of this invention is the use of combinations of homopolymers, copolymers, terpolymers, and tetrapolymers utilizing the above listed monomers.

Generally, a water dispersible aldehyde or aldehyde-generating compound can be utilized as the first crosslinking component of the gellable composition of the present, invention. Thus suitable first crosslinking component can be selected from the group consisting of aliphatic monoaldehydes, aromatic monoaldehydes, aliphatic dialdehydes, aromatic dialdehydes, and their derivatives. Preferred aldehydes and their derivatives can be selected from the group consisting of formaldehyde, paraformaldehyde, acetaldehyde, propionaldehyde, decanal, glutaraldehyde, terephthaldehyde, hexamethylenetetramine, glyoxal, glutaric dialdehyde, and mixtures thereof.

The second crosslinking component of the present invention is generally an aromatic compound or an alcohol that is water dispersible. The aromatic compound is a carboxylic acid as a phenolic compound suitable second crosslinking components include, but are not limited to, phenol, hydroxybenzyl amine, hydroquinone, resorcinol, cresol, catechol, p-aminosalicylic acid, furfuryl alcohol, phenyl acetate, phenyl propionate, phenyl butyrate, salicylic acid, phenyl salicylate, aspirin, p-hydroxybenzoic acid, methyl p-hydroxybenzoate, methyl o-hydroxybenzoate, ethyl p-hydroxybenzoate, o-hydroxybenzoic acid, hexyl p-hydroxybenzoate, melamine, and mixtures thereof.

The ammonium donor, represented as $NH_4^+$ concentration is present in the gellable composition in the range of from about 0.001 to about 1.0 mole per liter of the composition, preferably about 0.005 to about 0.5 mole per liter of the composition, and most preferably from 0.01 to 0.2 mole per liter of the composition.

The first crosslinking component is present in the composition in the range of from about 0.001 to about 1.0 mole per liter of the composition, preferably from about 0.005 to about 0.5 mole per liter of the composition, and most preferably from 0.01 to 0.2 mole per liter of the composition.

The water dispersible second crosslinking component is present in the composition in the range of from about 0.001 to about 1.0 mole per liter of the composition, preferably from about 0.05 to about 0.5 mole per liter of the composition, and most preferably from 0.01 to 0.2 mole per liter of the composition.

The acrylamide-containing polymer is present in the composition in the amount of from about 0.05 to about 10 weight percent, preferably from about 0.1 to about 5 weight percent, and most preferably from 0.2 to 4 weight percent. The concentration of polymer in the composition depends to some degree upon the molecular weight of the polymer. A high molecular weight results in a higher viscosity of the resulting gel for a particular concentration of polymer. Water generally makes up the rest of the composition.

Any suitable method can be employed for preparing the composition of the invention. Thus, any suitable mixing technique or order of addition of the components of the composition to each other can be employed. The mixing order can vary with the type of polymer used. However, it is preferred that the ammonium hydroxide be added to water before the polymer is added to avoid localized regions of pH contrast leading to the precipitation of the polymer.

The use of gelled polymers in oil field operations is well known to those skilled in the art. Generally, an aqueous solution containing the polymer and other gelling components is pumped into the well or a subterranean formation so that the solution forms a gel therein.

The present invention can be used in a similar manner. An aqueous solution containing the ammonium ion donor, the crosslinking components, and the acrylamide-containing polymer can be pumped into a well to be shut-in to form a gel. The present invention's advantage lies in the fact that, since the gelation of the polymer can be accelerated, the duration of time that the well must be shut-in, and thus removed from operation, in order to allow for the development of gel strength can be minimized.

The nature of the well treated is not critical to the practice of the present invention. The composition can be used in or can be injected into fresh water, salt water, or brines, as well as at a temperature range of from about 20° C. to about 205° C., preferably from about 65° C. to about 175° C., and most preferably from 90° C. to 150° C.

The following specific examples are intended to illustrate the advantages of the invention, but are not intended to unduly limit the scope of the invention.

EXAMPLE I

This example illustrates that the invention composition gels substantially faster than the composition without an ammonium ion donor.

The runs were carried out by first adding ammonium hydroxide (concentration shown in Table I) to 250 ml of 5% NaCl solution. Upon complete mixing, 2.5 g of a copolymer of acrylamide and sodium 2-acrylamido-2-methylpropane sulfonate (molar ratio 1.9 to 1, respectively) was added to the solution.

Aliquots (10 ml) of the test samples were placed into 16 mm by 120 mm glass vials followed by addition of crosslinking components shown in table I into the vials. The air caps of the vials were removed by sparging with nitrogen. The vials were then sealed and shaken. The vertical height (VH) of the sample fluid column was measured and recorded. The samples were then placed into ovens to age at constant temperature (93.3° C.). The samples were removed periodically for gellation measurements. The vial was placed horizontally, allowing the fluid to flow to some stabilized position within the vial. The distance between the bottom of the vial and the fluid front (L) was measured. The extent (%) of gellation is defined as:

% Gel Strength=100×(13.5 cm−L)/(13.5 cm−VH)

After the measurement is made, the sample is returned to the oven for continued aging. The test results are shown in Table I.

TABLE I

| | Gelation of Inventive Composition | | | | |
|---|---|---|---|---|---|
| | Crosslinking Component (mole/l) | | NH4 + Donor (mole/l) | Gelation Time (days) | |
| Run No. | Phenol | HCOH | [NH4OH] | Initial[a] | Final[b] |
| 1 | 0.007 | 0.023 | 0 | 21 | 33 |
| 2 | 0.015 | 0.047 | 0 | 14 | 29 |
| 3 | 0.022 | 0.070 | 0 | 14 | 29 |
| 4 | 0.030 | 0.093 | 0 | 8 | 14 |
| 5 | 0.007 | 0.023 | 0.016 | 3 | 37 |
| 6 | 0.015 | 0.047 | 0.031 | 3 | ND[c] |
| 7 | 0.022 | 0.070 | 0.047 | 2 | ND |
| 8 | 0.030 | 0.093 | 0.062 | 2 | 25 |
| 9 | 0.030 | 0.093 | 0.090 | 2 | 37 |
| 10 | 0.030 | 0.093 | 0.075 | 2 | 7 |
| 11 | 0.030 | 0.093 | 0.015 | 2 | 7 |
| 12 | 0.030 | 0.093 | 0.060 | 2 | 7 |
| 13 | 0.030 | 0.093 | 0.045 | 2 | 7 |
| 14 | 0.030 | 0.093 | 0.030 | 2 | 7 |
| 14 | 0.030 | 0.093 | 0.100 | 2 | ND |

[a]When the solution initiated gelling.
[b]When the gel strength reached 100%.
[c]ND, not determined.

Results in table I show that, when there was no ammonium hydroxide present in the composition (runs 1–4) it took as long as 21 days to initiate gelation and as long as 33 days to achieve full gel strength (run 1). With ammonium hydroxide present in the composition (i.e. the inventive composition, runs 5–14), the gelation was appreciably accelerated to as short as 2 days to initiate gelling and 7 days to achieve full gel strength (runs 10–4).

EXAMPLE II

This example illustrates inventive compositions comprising hexamethylenetetramine as the ammonium ion donor.

The runs were carried out exactly the same as those described in Example I except that hexamethylenetetramine was used to replace ammonium hydroxide as the ammonium ion donor. The results are shown in Table II.

TABLE II

| | Gelation of Inventive Composition | | | | | |
|---|---|---|---|---|---|---|
| Run No. | Component (mole/l) | | NH4+ Donor (mole/l) | | Gelation Time (days) | |
| | Phenol | HCOH | HMTA[a] | [NH4+][b] | Initial[c] | Final[d] |
| 16 | 0.007 | 0.023 | 0 | 0 | 21 | 33 |
| 17 | 0.015 | 0.047 | 0 | 0 | 14 | 29 |
| 18 | 0.022 | 0.070 | 0 | 0 | 14 | 29 |
| 19 | 0.030 | 0.093 | 0 | 0 | 8 | 14 |
| 20 | 0.007 | 0 | 0.004 | 0.015 | 7 | 10 |
| 21 | 0.007 | 0.011 | 0.002 | 0.007 | 7 | 14 |
| 22 | 0.015 | 0 | 0.007 | 0.030 | 4 | 8 |
| 23 | 0.015 | 0.022 | 0.004 | 0.015 | 3 | 8 |
| 24 | 0.022 | 0 | 0.011 | 0.045 | 3 | 7 |
| 25 | 0.022 | 0.033 | 0.005 | 0.021 | 3 | 7 |
| 26 | 0.030 | 0 | 0.015 | 0.059 | 3 | 7 |
| 27 | 0.030 | 0.045 | 0.007 | 0.028 | 2 | 7 |

[a]HMTA = hexamethylenetetramine.
[b][NH4+] denotes the MH4+ concentration derived from HMTA.
[c]See footnote [a], Table I.
[d]See footnote [b], Table II.

In a manner similar to Table I, Table II shows that the gelation of the inventive gellable compositions was as short as 2 days to initiate and as 7 days to complete (run 27). Table II further shows that when HMTA was used as the ammonium ion donor, HMTA also served as a crosslinking component (runs 20, 22, 24, and 26). These results suggest that environmentally less suitable formaldehyde call be eliminated by using HMTA in the gellable composition.

EXAMPLE III

This example illustrates the inventive composition employing ammonium chloride as the ammonium ion donor.

The runs were carried out identical to those described in Example I with the exception that ammonium chloride was used in place of ammonium hydroxide as the ammonium ion donor. The results are shown in Table III below.

TABLE III

| | Gelation of Inventive Composition | | | | |
|---|---|---|---|---|---|
| | Component (mole/l) | | NH$_4^+$ Donor (mole/l) | Gelation Time (days) | |
| Run No. | Phenol | HCOH | NH$_4$Cl | Initial$^a$ | Final$^b$ |
| 28 | 0.007 | 0.023 | 0 | 21 | 33 |
| 29 | 0.015 | 0.047 | 0 | 14 | 29 |
| 30 | 0.022 | 0.070 | 0 | 14 | 29 |
| 31 | 0.030 | 0.093 | 0 | 8 | 14 |
| 32 | 0.007 | 0.023 | 0.016 | 28 | 40 |
| 33 | 0.015 | 0.047 | 0.031 | 10 | 17 |
| 34 | 0.022 | 0.070 | 0.047 | 5 | 7 |
| 35 | 0.030 | 0.093 | 0.062 | 3 | 5 |

$^{a,b}$See corresponding footnotes in Table I.

Again, similar to the results in Table I and II, the results in Table III demonstrate that using NH$_4$Cl as the ammonium ion donor, the inventive composition greatly reduces the gelation time to as short as 3 days to initiate and as 5 days to complete (run 35). It was also found that the inventive compositions appeared to produce harder, stronger gels.

EXAMPLE IV

This example shows that the inventive composition also reduces the gelation time in synthetic seawater.

The runs were carried out the same as those described in Example I except that the runs were done in a synthetic seawater instead of in 5% NaCl. The synthetic seawater used has the following formula:

| NaHCO$_3$ | 3.69 g |
|---|---|
| Na$_2$SO$_4$ | 77.19 g |
| NaCl | 429.00 g |
| CaCl$_2$.2H$_2$O | 29.58 g |
| MgCl$_2$.2H$_2$O | 193.92 g |
| distilled water | 1.0 l |

The results are shown in Table IV below.

TABLE IV

| | Gelation of Inventive Composition | | | | | | |
|---|---|---|---|---|---|---|---|
| | Crosslinking Component | | NH$_4^+$ ion Donor | | | Gelation Time | |
| Run No. | HCOH mole/l | Phenol mole/l | 30% NH$_4$OH ml/250 ml | 10% NH$_4$Cl ml/10 ml | [NH$_4^+$]$^a$ mole/l | Initial$^b$ (Days) | Final$^c$ (Days) |
| 36 | 0.023 | 0.023 | 0 | 0 | 0 | 7 | 20 |
| 37 | 0.047 | 0.047 | 0 | 0 | 0 | 7 | 20 |
| 38 | 0.070 | 0.070 | 0 | 0 | 0 | 7 | 20 |
| 39 | 0.093 | 0.093 | 0 | 0 | 0 | 7 | 13 |
| 40 | 0.023 | 0.023 | 0.49 | 0 | 0.016 | 4 | 7 |
| 41 | 0.047 | 0.047 | 0.99 | 0 | 0.031 | 2 | 5 |
| 42 | 0.070 | 0.070 | 1.48 | 0 | 0.047 | 2 | 4 |
| 43 | 0.093 | 0.093 | 1.97 | 0 | 0.062 | 1 | 4 |
| 44 | 0.023 | 0.023 | 0 | 0.08 | 0.016 | 5 | 7 |
| 45 | 0.047 | 0.047 | 0 | 0.17 | 0.031 | 2 | 4 |
| 46 | 0.070 | 0.070 | 0 | 0.25 | 0.047 | 2 | 4 |
| 47 | 0.093 | 0.093 | 0 | 0.33 | 0.062 | 1 | 2 |

$^a$The [NH$_4^+$] concentration denotes the concentration derived from either NH$_4$OH or NH$_4$Cl.
$^b$See footnote $^a$, Table I.
$^c$See footnote $^b$, Table I.

Although the initial gelation time of a gellable composition without an ammonium ion donor present therein (runs 36–39) was reduced to 7 days in synthetic seawater (compared to as long as 21 days in Table I, run 1), it still took as long as 20 days to develop full gel strength (runs 36–38, Table IV) unless the concentration of crosslinking components was substantially increased to 0.093 mole/l each (run 39, Table IV).

Table IV further shows that, in synthetic seawater, the inventive composition comprising NH$_4$OH (runs 40–43) or NH$_4$Cl (runs 44–47) further reduced the time required to initiate gelation to as short as only 1 day (runs 43 and 47). The completion time for developing full gel strength was reduced to as short as 2 days (run 47).

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

That which is claimed is:

1. A composition comprises: (1) an ammonium ion donor; (2) a water soluble acrylamide-containing polymer; (3) a first crosslinking component selected from the group consisting of aldehydes and aldehyde-generating compounds; (4) a second crosslinking component selected from the group consisting of aromatic compounds and alcohols; wherein said aromatic compounds are selected from the group consisting of carboxylic acids and phenolic compounds; and (5) water wherein said ammonium ion donor is present in an effective amount to accelerate the gelation of said composition and in the range of from about 0.001 to about 1 mole per liter of said composition.

2. A composition according to claim 1 wherein said ammonium ion donor is selected from the group consisting of ammonia, ammonium hydroxide, ammonium chloride, ammonium iodide, ammonium bromide, ammonium sulfate, ammonium phosphate, ammonium nitrate, ammonium molybdate, ammonium formate, ammonium acetate, ammonium citrate, ammonium oxalate, hexamethylenetetramine, ammonium ethylenediaminetetraacetic acid, and mixtures thereof.

3. A composition according to claim 2 wherein said ammonium ion donor is ammonium chloride.

4. A composition according to claim 2 wherein said ammonium ion donor is hexamethylenetetramine.

5. A composition according to claim 2 wherein said ammonium ion donor is ammonium hydroxide.

6. A composition according to claim 1 wherein said acrylamide-containing polymer is selected from the group consisting of homopolymers of acrylamide, homopolymers of methacrylamide, copolymers of acrylamide and acrylic acid, copolymers of acrylamide and potassium acrylate, copolymers of acrylamide and sodium acrylate, copolymers of acrylamide and N,N-dimethylacrylamide, copolymers of acrylamide and methacrylamide, copolymers of acrylamide and sodium 2-acrylamido-2-methylpropane sulfonate, copolymers of acrylamide and N-vinyl-2-pyrrolidone, terpolymers of acrylamide, N,N-dimethylacrylamide and 2-acrylamido-2-methylpropane sulfonate, and terpolymers of acrylamide, N-vinyl-2-pyrrolidone, and sodium 2-acrylamido-2-methylpropane sulfonate, and mixtures thereof.

7. A composition according to claim 6 wherein said acrylamide-containing polymer is a copolymer of acrylamide and sodium 2-acrylamido-2-methylpropane sulfonate.

8. A composition according to claim 1 wherein said first crosslinking component is selected from the group consisting of formaldehyde, paraformaldehyde, acetaldehyde, propionaldehyde, decanal, glutaraldehyde, terephthaldehyde, trioxane, hexamethlenetetramine, glyoxal, gluetaric dialdehyde, and mixtures thereof.

9. A composition according to claim 8 wherein said first crosslinking component is formaldehyde.

10. A composition according to claim 8 wherein said first crosslinking component is hexamethylenetetramine.

11. A composition according to claim 1 wherein said second crosslinking component is selected for phenol, hydroxybenzylamine, hydroquinone, resorcinol, cresol, catechol, p-aminobenzoic acid, p-aminosalicylic acid, furfuryl alcohol, phenyl acetate, phenyl propionate, phenyl butyrate, salicylic acid, phenyl salicylate, aspirin, p-hydroxybenzoic acid, methyl p-hydroxybenzoate, methyl o-hydroxybenzoate, ethyl p-hydroxybenzoate, o-hydroxybenzoic acid, hexyl p-hydroxybenzoate, melamine and mixtures thereof.

12. A composition according to claim 11 wherein said second crosslinking component is phenol.

13. A composition according to claim 1 wherein:
said ammonium ion donor is selected from the group consisting of ammonia, ammonium hydroxide, ammonium chloride, ammonium iodide, ammonium bromide, ammonium sulfate, ammonium phosphate, ammonium nitrate, ammonium molybdate, ammonium formate, ammonium acetate, ammonium citrate, ammonium oxalate, hexamethylenetetramine, ammonium ethylenediaminetetraacetic acid, and mixtures thereof;
said acrylamide-containing polymer is selected from the group cons is ting of homopolymers of acrylamide, homopolymers of methacrylamide, copolymers of acrylamide and acrylic acid, copolymers of acrylamide and potassium acrylate, copolymers of acrylamide and sodium acrylate, copolymers of acryl amide and N,N-dimethyl acrylamide, copolymers of acrylamide and methacrylamide, copolymers of acrylamide and sodium 2-acrylamido-2-methylpropane sulfonate, copolymers of acrylamide and N-vinyl-2-pyrrolidone terpolymers of acrylamide, N,N-dimethylacrylamide and 2-acrylamido-2-methylpropane sulfonate, and terpolymers of acrylamide, N-vinyl-2-pyrrolidone, and sodium 2-acrylamido-2-methylpropane sulfonate, and mixtures thereof;
said first cross linking component is selected from the group consisting of formaldehyde, paraformaldehyde, acetaldehyde, propionaldehyde, decanal, glutaraldehyde, terephthaldehyde, trioxane, hexamethylenetetramine, glyoxal, glutaric dialdehyde, and mixtures thereof; and
said second cross linking component is selected from the group consisting of phenol, hydroxybenzylamine, hydroquinone, resorcinol, cresol, catechol, p-aminobenzoic acid, p-aminosalicylic acid, furfuryl alcohol, phenyl acetate, phenyl propionate, phenyl butyrate, salicylic acid, phenyl salicylate, aspirin, p-hydroxybenzoic acid, methyl p-hydroxybenzoate, methyl o-hydroxybenzoate, ethyl p-hydroxybenzoate, o-hydroxybenzoic acid, hexyl p-hydroxybenzoate, melamine, and mixtures thereof.

14. A composition according to claim 13 wherein said ammonium ion donor is ammonium chloride; said acrylamide-containing polymer is copolymers of acrylamide and sodium 2-acrylamido-2-methylpropane sulfonate; said first crosslinking component is formaldehyde; and said second crosslinking component is phenol.

15. A composition according to claim 13 wherein said ammonium ion donor is hexamethylenetetramins; said acrylamide-containing polymer is copolymers of acrylamide and sodium 2-acrylamido-2-methylpropane sulfonate; said first crosslinking component is hexamethylenetetramine; and said second crosslinking component is phenol.

16. A composition according to claim 1 wherein said ammonium ion donor is present in said composition in the range of from about 0.001 to about 1.0 mole per liter of said composition.

17. A composition according to claim 16 wherein said range is from 0.01 to 0.2 mole per liter of said composition.

18. A composition according to claim 1 wherein said acrylamide-containing polymer is present in said composition in the range of from about 0.05 to about 10 weight percent of said composition, based on total weight of said composition.

19. A composition according to claim 18 wherein said range is from 0.2 to 4 weight percent.

20. A composition according to claim 1 wherein said first crosslinking component is present in said composition in the range of from about 0.001 to about 1.0 mole per liter of said composition.

21. A composition according to claim 20 wherein said range is 0.01 to 0.2 mole per liter of said composition.

22. A composition according to claim 1 wherein said second crosslinking component is present in said composition in the range of from about 0.001 to about 1 mole per liter of said composition.

23. A composition according to claim 22 wherein said range is from 0.01 to 0.2 mole per liter of said composition.

24. A composition according to claim 1 wherein sand composition comprises: (1) from 0.01 to 0.2 mole ammonium chloride per liter of said composition; (2) from 0.2 to 4 weight percent of polyacrylamide per liter of said composition; (3) from 0.01 to 0.2 mole of formaldehyde per liter of said composition; (4) from 0.01 to 0.2 mole of phenol per liter of said composition; and (5) water making up the result of said composition.

25. A composition according to claim 1 wherein said composition comprises: (1) from 0.01 to 0.2 mole hexamethylenetetramine per liter of said composition; (2) from 0.2 to 4 weight percent of polyacrylamide per liter of said composition; (3) from 0.01 to 0.2 mole of hexamethylenetetramine per liter of said composition; (4) from 0.01 to 0.2 mole of phenol per liter of said composition; and (5) water making up the rest of said composition.

* * * * *